(12) United States Patent
Yang et al.

(10) Patent No.: US 8,625,066 B2
(45) Date of Patent: Jan. 7, 2014

(54) DISPLAY PANEL AND MANUFACTURING METHOD THEREOF

(75) Inventors: Wei-Chieh Yang, Hsin-Chu (TW); Wei-Yi Chien, Hsin-Chu (TW); Yu-Rung Huang, Hsin-Chu (TW)

(73) Assignee: AU Optronics Corp., Hsinchu (TW)

( * ) Notice: Subject to any disclaimer, the term of this patent is extended or adjusted under 35 U.S.C. 154(b) by 282 days.

(21) Appl. No.: 13/149,157

(22) Filed: May 31, 2011

(65) Prior Publication Data

US 2011/0310344 A1  Dec. 22, 2011

(30) Foreign Application Priority Data

Jun. 18, 2010  (TW) ................................ 99119964 A (51) Int. Cl.
*G02F 1/1339* (2006.01)
(52) U.S. Cl.
USPC ............ 349/153; 349/154; 349/155; 349/156
(58) Field of Classification Search
USPC ......................................................... 349/153
See application file for complete search history.

(56) References Cited

U.S. PATENT DOCUMENTS

| | | | | |
|---|---|---|---|---|
| 6,317,186 B1 * | 11/2001 | Miwa et al. | ................... | 349/153 |
| 7,812,908 B2 * | 10/2010 | Koyama | ........................ | 349/122 |
| 2002/0196393 A1 * | 12/2002 | Tashiro et al. | ................ | 349/106 |
| 2004/0125317 A1 * | 7/2004 | Suzuki | ........................... | 349/153 |
| 2004/0239864 A1 * | 12/2004 | Asakawa | ....................... | 349/153 |
| 2006/0109413 A1 * | 5/2006 | Lee | ................................. | 349/153 |
| 2008/0207993 A1 * | 8/2008 | Maruyama et al. | ............ | 600/101 |
| 2008/0300457 A1 * | 12/2008 | Hosaka et al. | ................ | 600/110 |
| 2009/0057004 A1 * | 3/2009 | Watanabe | ...................... | 174/383 |
| 2009/0231534 A1 * | 9/2009 | Morita | .......................... | 349/153 |
| 2009/0237588 A1 * | 9/2009 | Takenaka et al. | .............. | 349/58 |

FOREIGN PATENT DOCUMENTS

| | | |
|---|---|---|
| CN | 1564961 A | 1/2005 |
| JP | 2001-066607 | 3/2001 |

* cited by examiner

*Primary Examiner* — Edward Glick
*Assistant Examiner* — Sang V Nguyen
(74) *Attorney, Agent, or Firm* — WPAT, PC; Justin King (57) ABSTRACT

A display panel includes a first substrate, a second substrate and a sealant. The first substrate has a display region and a sealant coating region, the sealant coating region surrounds the display region. The second substrate is disposed above the first substrate. The sealant is disposed between the first substrate and the second substrate and is located in the sealant coating region. The sealant includes at least one corner portion and a plurality of strip-shaped portions. The adjacent strip-shaped portions intersect at the corner portion, and a maximum width of the corner portion is larger than widths of the strip-shaped portions. A manufacturing method of the display panel is also provided.

7 Claims, 14 Drawing Sheets

DISPLAY PANEL AND MANUFACTURING METHOD THEREOF

FIELD OF THE INVENTION

The present invention relates to a display panel and a manufacturing method thereof, and more particularly to a display panel having a narrow bezel and a manufacturing method thereof.

BACKGROUND OF THE INVENTION

The rapid progress of science and technology in modern society largely benefits from the rapid progress of semiconductor components or human-machine display devices. Because of its excellent display quality and economic advantage, cathode ray tubes (CRTs) have dominated the market in recent years. However, it may not be a perfect choice for a user who simultaneously operates several computer terminals/displays, or from the view of environmental protection. In view of the energy saving trend, the CRT has many problems, such as limited space utilization and considerable energy consumption. In particular, the CRT is not capable of providing a solution to meet the light, slim, short and small tendency today and the demand on low power consumption. Therefore, the liquid crystal display (LCD) with the predominant features, such as high display quality, high space utilization, low power consumption and no radiation, gradually becomes the main stream of the market.

Figure 1A:
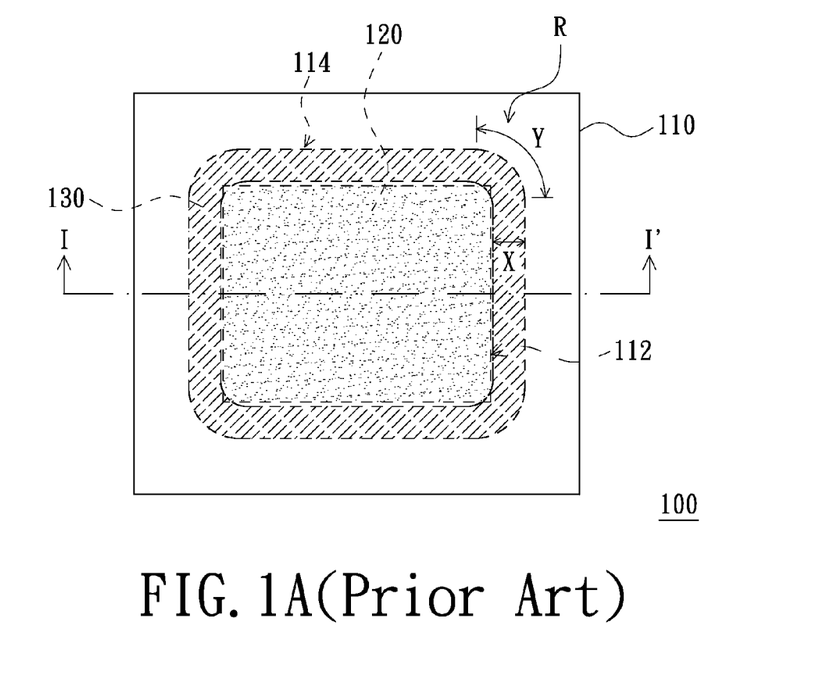
FIG. 1A is a schematic, top view of a conventional liquid crystal display panel.
Figure 1B:
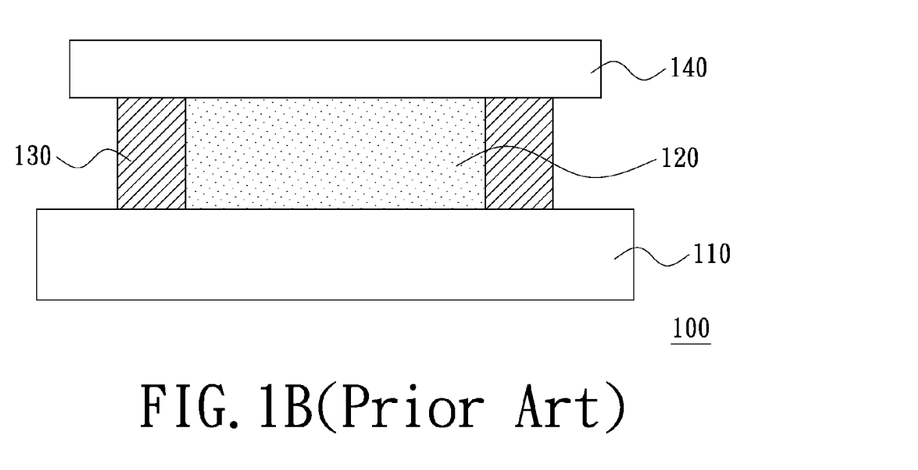
FIG. 1B is a schematic, cross-sectional view of the liquid crystal display panel of FIG. 1A, taken along a line I-I'.

FIG. 1A is a schematic, top view of a conventional liquid crystal display panel, and FIG. 1B is a schematic, cross-sectional view of the liquid crystal display panel of FIG. 1A, taken along a line I-I'. Referring to FIG. 1A and FIG. 1B, a liquid crystal display panel 100 is mainly constituted of an active element array substrate 110, a liquid crystal layer 120, a sealant 130 and a color filter 140. The color filter 140 is disposed above the active element array substrate 110. The liquid crystal layer 120 and the sealant 130 are both disposed between the active element array substrate 110 and the color filter 140. The active element array substrate 110 has a display region 112 and a sealant coating region 114. The liquid crystal layer 120 is located in the display region 112. The sealant 130 is located in the sealant coating region 114 and surrounds the liquid crystal layer 120, so as to seal the liquid crystal layer 120 between the active element array substrate 110 and the color filter 140.

It can be seen from FIG. 1A, in the conventional liquid crystal display panel 100, the sealant 130 forms an arc at each of corner portions R, and an arc circumference Y of each corner portion R is generally larger than a width X of the sealant 130. Since the area of the arc corner portions R contacted with the active element array substrate 110 and the color filter 140 is small, the adhesive force between the corner portions R of the sealant 130 and the active element array substrate 110 and between the corner portions R and the color filter 140 is low, thereby a peeling phenomenon of the sealant 130 is easily occurred at the corner portions R. Moreover, since the arc circumference Y of each corner portion R is larger than the width X of the sealant 130, inner edges of the corner portions of the sealant 130 readily span the display region 112 to pollute the liquid crystal layer 120. Thus, product quality or product yield is reduced. As for the liquid crystal display panel having a narrow bezel, the control for the tensile strength and the width of the sealant 130 is more important than that of the liquid crystal display panel having normal specification. Hence, how to promote the tensile strength of the sealant and accurately control the position of the sealant is paid attention to by those ordinarily skilled in the art.

SUMMARY OF THE INVENTION

The present invention provides a display panel which includes a sealant having sufficient tensile strength and accurate width control.

The present invention also provides a manufacturing method of display panel, the manufacturing method gives consideration to tensile strength of a sealant and accuracy of width control, thereby improving process yield.

To achieve the above-mentioned advantage, the present invention provides a display panel. The display panel includes a first substrate, a second substrate and a sealant. The first substrate has a display region and a sealant coating region, and the sealant coating region surrounds the display region. The second substrate is disposed above the first substrate. The sealant is disposed between the first substrate and the second substrate and is located in the sealant coating region. A distance is formed between the sealant and the display region. The sealant includes at least one corner portion and a plurality of strip-shaped portions. The adjacent strip-shaped portions intersect at the corner portion, and a maximum width of the corner portion is larger than widths of the strip-shaped portions.

In one embodiment of the present invention, the corner portion is arc-shaped, and an arc circumference of a side of the corner portion away from the display region is smaller than the widths of the strip-shaped portions.

In one embodiment of the present invention, the strip-shaped portions include a first sealant strip and a second sealant strip. The first sealant strip is extended along a first direction. The second sealant strip is extended along a second direction and intersects the first sealant strip at the corner portion. The corner portion includes at least one extending block extended along at least one of the first direction and the second direction from a side of the corner portion away from the display region.

In one embodiment of the present invention, the extending block is extended along the first direction, and a length of the extending block along the first direction is smaller than one third of a width of the first sealant strip. Or, the extending block is extended along the second direction, and a length of the extending block along the second direction is smaller than one third of a width of the second sealant strip.

In one embodiment of the present invention, the corner portion has a retracting region, and the retracting region is retracted from a side of the corner portion adjacent to the display region toward a direction away from the display region.

In one embodiment of the present invention, the retracting region is retracted a retracting distance d away from the display region along the second direction, the width of the first sealant strip is $W_1$, and the retracting distance d meets the following expression: $W_1/10 \leq d \leq W_1/5$. Or, the retracting region is retracted a retracting distance d away from the display region along the first direction, the width of the second sealant strip is $W_2$, and the retracting distance d meets the following expression: $W_2/10 \leq d \leq W_2/5$.

In one embodiment of the present invention, the display panel further includes a display medium layer disposed between the first substrate and a second substrate, and the display medium layer is located in the display region of the first substrate.

In one embodiment of the present invention, the widths of the strip-shaped portions are smaller than or are equal to 600 millimeters.

The present invention also provides a manufacturing method of display panel. Firstly, a first substrate is provided, the first substrate has a display region and a sealant coating region, and the sealant coating region surrounds the display region. And then, a first sealant strip is coated along a first direction in the sealant coating region, and a first distance is formed between the first sealant strip and the display region. A second sealant strip is coated along a second direction in the sealant coating region. A third distance D is formed between two ends of the second sealant strip and the first sealant strip adjacent to the second sealant strip, and a second distance is formed between the second sealant strip and the display region. After that, a second substrate is provided and is pressed onto the first substrate. After the second substrate is pressed onto the first substrate, the first sealant strip and the second sealant strip intersect to form a corner portion. The corner portion includes at least one extending block extended along at least one of the first direction and the second direction from a side of the corner portion away from the display region.

In one embodiment of the present invention, after the first sealant strip and the second sealant strip are formed, a display medium layer is formed in the display region of the first substrate.

In one embodiment of the present invention, the extending block is extended along the first direction, and a length of the extending block along the first direction is smaller than one third of a width of the first sealant strip.

In one embodiment of the present invention, the extending block is extended along the second direction, and a length of the extending block along the second direction is smaller than one third of a width of the second sealant strip.

In one embodiment of the present invention, the third distance D meets the following expression: $0<D\leq 100$ micrometers.

The present invention also provides a manufacturing method of display panel. Firstly, a first substrate is provided, the first substrate has a display region and a sealant coating region, and the sealant coating region surrounds the display region. The sealant coating region includes at least one corner region and a plurality of strip-shaped regions. The corner region is located between the adjacent strip-shaped regions. And then, a sealant coating apparatus is provided, the sealant coating apparatus is suitable to be moved along the sealant coating region. A sealant is coated in the sealant coating region via the sealant coating apparatus. A distance is formed between the sealant and the display region. A speed of the sealant coating apparatus moved along the corner region is smaller than or is equal to one third of a speed of the sealant coating apparatus moved along the strip-shaped regions. After that, a second substrate is provided and is pressed onto the first substrate. The second substrate is fixed to the first substrate via the sealant.

In one embodiment of the present invention, after the sealant is formed, a liquid crystal display layer is formed in the display region of the first substrate.

In the present invention, the width of the sealant is increased from the side of the sealant away from the display region, so that the maximum width of the corner portion of the sealant is larger than the widths of the strip-shaped portions. Therefore, tensile strength of the sealant is promoted. The sealant can be avoided from spanning or being too close to the display region, and thereby the display medium layer in the display region can be prevented from being polluted.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2A:
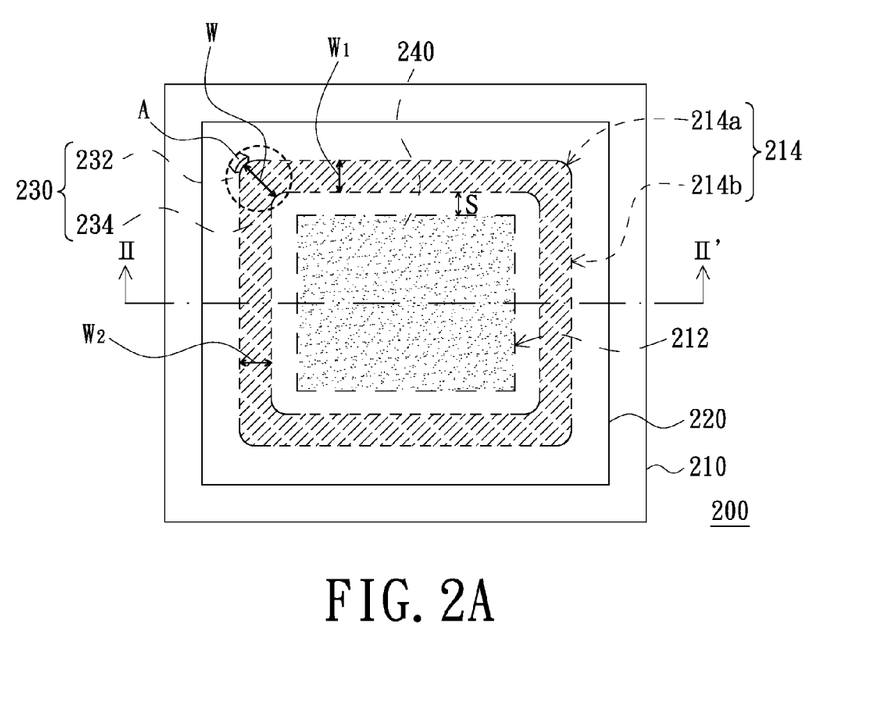
FIG. 2A is a schematic, top view of a display panel according to an embodiment of the present invention.
Figure 2B:
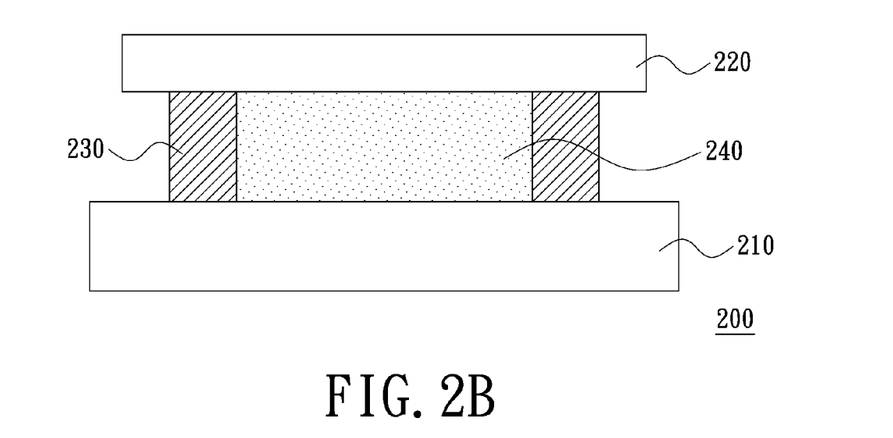
FIG. 2B is a schematic, cross-sectional view of the liquid crystal display panel of FIG. 2A, taken along a line II-II'.

FIG. 2A is a schematic, top view of a display panel according to an embodiment of the present invention, and FIG. 2B is a schematic, cross-sectional view of the liquid crystal display panel of FIG. 2A, taken along a line II-II'. Referring to FIG. 2A and FIG. 2B, a liquid crystal display panel 200 includes a first substrate 210, a second substrate 220 and a sealant 230, wherein the first substrate 210 has a display region 212 and a sealant coating region 214, and the sealant coating region 214 surrounds the display region 212. A pixel array (not shown) of the liquid crystal display panel 200 is disposed in the display region 212 of the first substrate 210.

The second substrate 220 is disposed above the first substrate 210. The sealant 230 is disposed between the first substrate 210 and the second substrate 220 and is located in the sealant coating region 214. It should be noted that a distance S is formed between the sealant 230 and the display region 212, wherein S is a positive number, that is, S>0. In other words, even if the sealant 230 covers the entire sealant coating region 214, the sealant 230 still keeps the distance S from the display region 212, so as to prevent the sealant 230 from polluting components in the display region 212.

The sealant 230 includes at least one corner portions 232 and a plurality of strip-shaped portions 234, wherein FIG. 2A shows four corner portions 232. The adjacent strip-shaped portions 234 intersect at the corner portions 232, and a maximum width W of at least one of the corner portions 232 is larger than widths $W_1$ and $W_2$ of the strip-shaped portions 234. The widths $W_1$ and $W_2$ of the strip-shaped portions 234 are smaller than or are equal to 600 millimeters.

More specifically, the first substrate 210 can be an active element array substrate, such as a thin film transistor (TFT) array substrate. The second substrate 220 can be, but not limited to, a color filter.

Additionally, the liquid crystal display panel 200 also includes a display medium layer 240 which is disposed between the first substrate 210 and the second substrate 220. The display medium layer 240 is located in the display region 212 and surrounded by the sealant 230. In the present embodiment, the display medium layer 240 is, for example, but not limited to, a liquid crystal layer. For convenient description, an area of the display region 212 of FIG. 2A is larger than a coating region of the display medium layer 240, but this does not limit the present invention.

Figure 3:
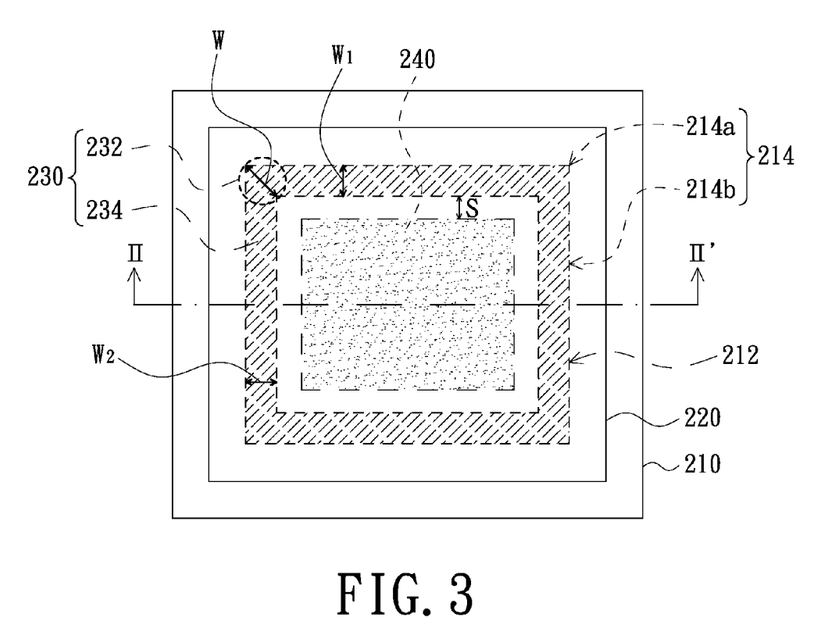
FIG. 3 is a schematic, top view of a display panel according to another embodiment of the present invention.

In the present embodiment, the sealant 230 includes four corner portions 232, and the corner portions 232 are substantially arc-shaped. Particularly, an arc circumference A of a side of each corner portion 232 away from the display region 212 is smaller than the widths $W_1$ and $W_2$ of the strip-shaped portions 234. That is, the arc circumference A meets the following expressions: $0<A<W_1$ and $0<A<W_2$. Moreover, the smaller the arc circumference A is, the larger the width W of each of the corner portions 232 is, and the corner portions 232 are more approximate to right angles. Moreover, in an alternative embodiment, the corner portions 232 of the sealant 230 can be right angles, as shown in FIG. 3.

It can be seen from the above description, the corner portions 232 of the sealants 230 of the crystal display panel 200 are designed to be substantially right angles, so that the width W of each of the corner portions 232 is increased from a side of the corner portion 232 away from the display region 212. In such way, the sealant 230 can be prevented from spanning or being too close to the display region 212, so that the sealant 230 does not flow into the display region 212. Thereby, the display medium layer 240 in the display region 212 can be prevented from being polluted. Particularly, inner edges of the corner portions 232 of the sealant 230 are prevented from spanning the display region 212, and thereby the area of the corner portions 232 of the sealant 230 contacted with the first substrate 210 and the second substrate 220 is increased. More specifically, compared the sealant 230 with the conventional sealant having a consistent width, the area of the sealant 230 contacted with the first substrate 210 and the second substrate 220 can be increased by 64 percent, and thereby tensile strength of each of the corner portions 232 of the sealant 230 can be promoted. Thus, in subsequent tensile strength test, the sealant 230 can be prevented from being peeled off at the corner portions 232.

In order to make the present invention be more readily apparent to those ordinarily skilled in the art, the following embodiments will accompany drawings to describe the manufacturing process of the display panel, but the present invention is not limited to the following embodiments.

Figure 4:
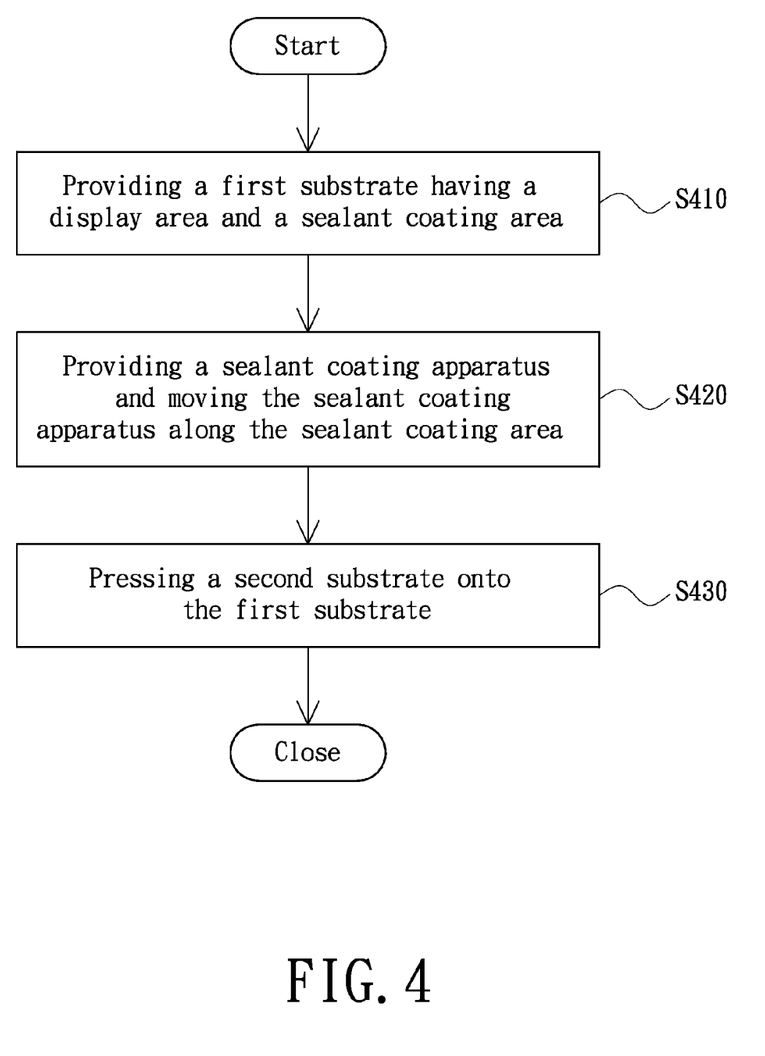
FIG. 4 is a manufacturing flow chart of a display panel according to an embodiment of the present invention.

FIG. 4 is a manufacturing flow chart of a display panel according to an embodiment of the present invention. Referring to FIG. 2A and FIG. 4, firstly, as mentioned in step S410,
the first substrate 210 is provided, and the first substrate 210 has the display region 212 and the sealant coating region 214. The sealant coating region 214 includes at least one corner region 214a (FIG. 3 shows four corner regions) and a plurality of strip-shaped regions 214b, and each corner region 214a is located between the adjacent strip-shaped regions 214b.

And then, as mentioned in step S420, a sealant coating apparatus is provided. The sealant coating apparatus is moved along the sealant coating region 214 so as to coat the sealant 230 in the sealant coating region 214. A distance S is formed between the sealant 230 and the display region 212, wherein S is a positive number, that is, S>0. Particularly, a speed of the sealant coating apparatus moved along the corner regions 214a is smaller than or is equal to one third of a speed of the sealant coating apparatus moved along the strip-shaped regions 214b. In such way, the corner portions 232 of the sealant 230 which are approximate to right angles can be formed in the sealant coating region 214.

In the present embodiment, the speed of the sealant coating apparatus moved along the strip-shaped regions 214b is 30 millimeters per second, and the speed of the sealant coating apparatus moved along the corner regions 214a is 10 millimeters per second. However, the above-mentioned speed is an embodiment of the present invention, and the present invention is not limited to the embodiment.

After that, as mentioned in step S430, the second substrate 220 is provided, and the second substrate 220 is pressed onto the first substrate 210. The second substrate 220 is connected to the first substrate 210 via the sealant 230. It is worth mentioning that, in the present embodiment, after forming the sealant 230, the display medium layer 240 is formed in the display region 212. In the present embodiment, the display medium layer 240 is, for example, a liquid crystal layer, and a method for forming the display medium layer 240 can be an injection method, that is, after the second substrate 220 is pressed onto the first substrate 210, liquid crystal is injected between the first substrate 210 and the second substrate 220. In an alternative embodiment, an one drop filling (ODF) method can also be used to form the display medium layer 240, that is, after the sealant 230 is formed, the liquid crystal is dropped into the display region 212 and then the second substrate 220 is pressed onto the first substrate 210.

In other embodiments of the present invention, other methods can be used to increase the area of the corner portions of the sealant contacted with the display panel and the upper and lower substrates, some embodiments will be described hereinafter.

Figure 5:
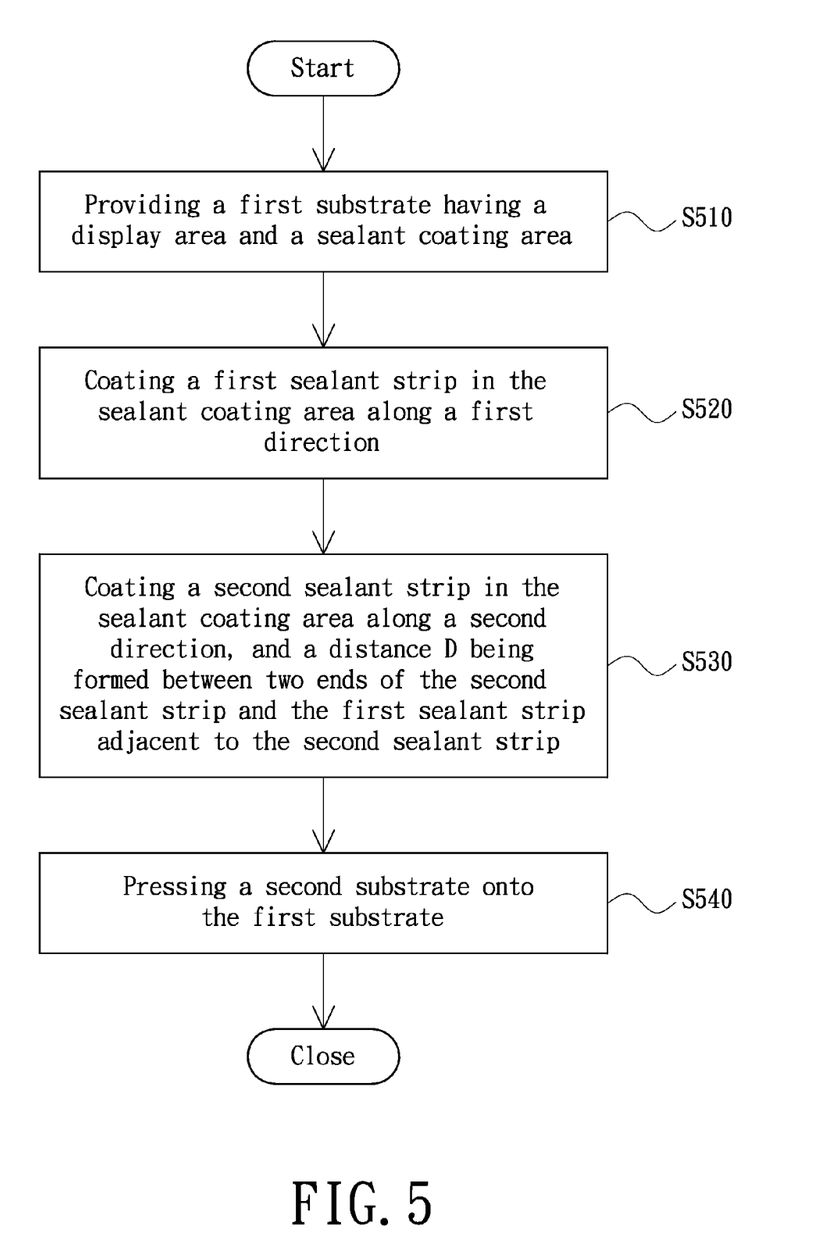
FIG. 5 is a manufacturing flow chart of a display panel according to another embodiment of the present invention.
Figure 6:
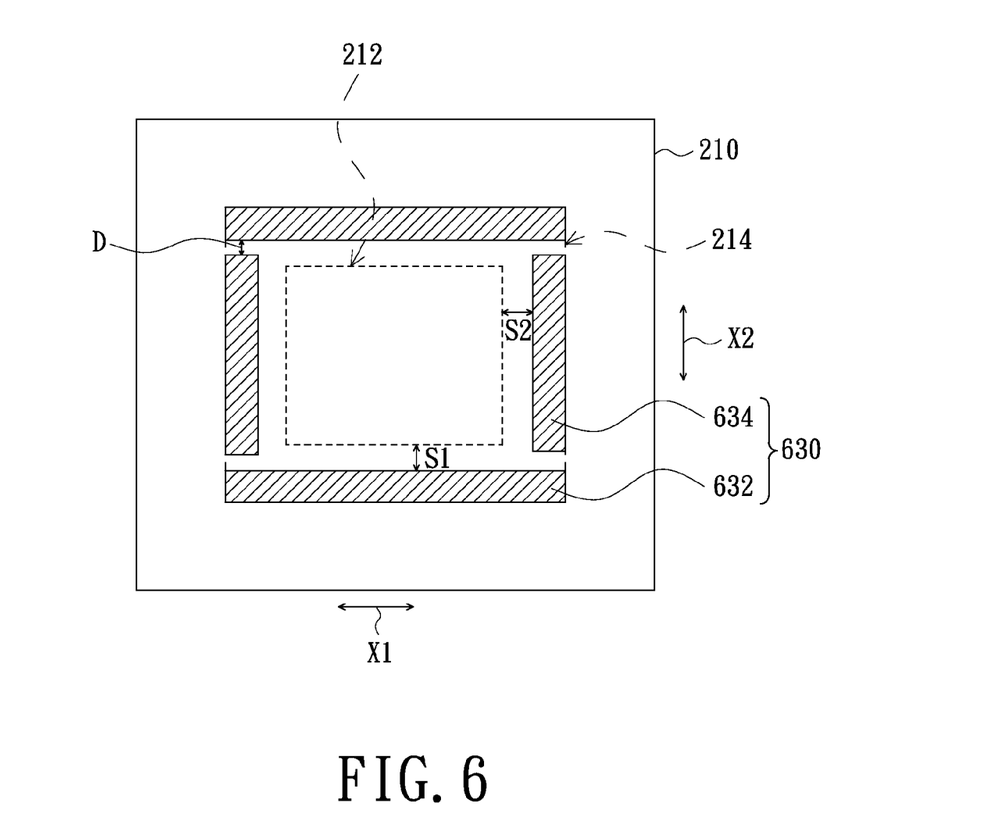
FIG. 6 is a schematic view of a sealant coated on a first substrate according to another embodiment of the present invention.
Figure 7:
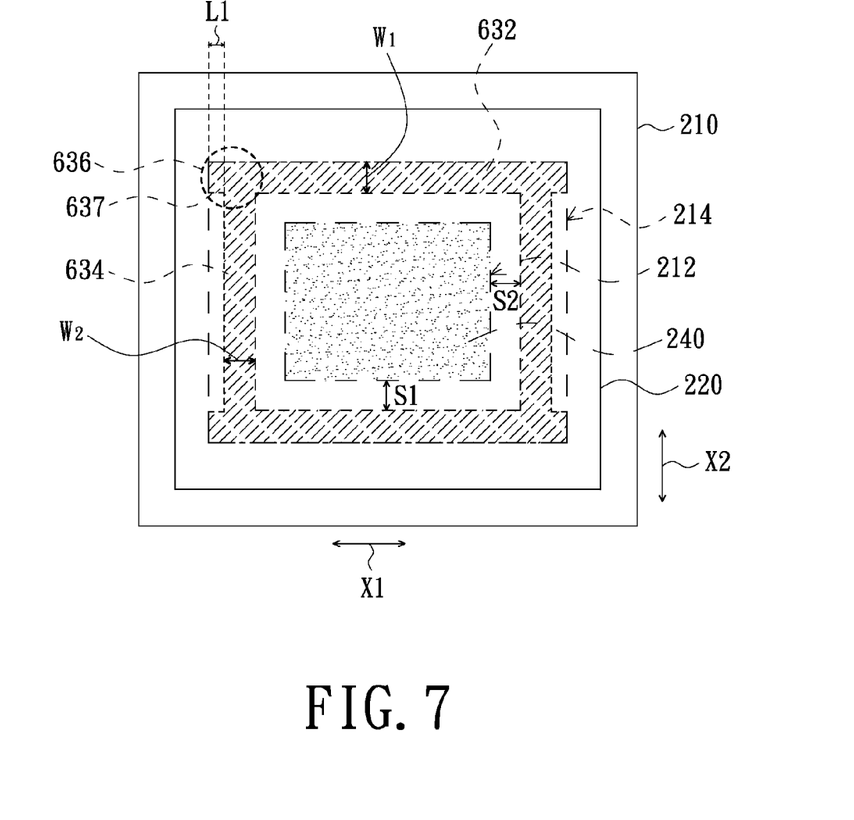
FIG. 7 is a schematic, top view of a display panel according to another embodiment of the present invention.

FIG. 5 is a manufacturing flow chart of a display panel according to another embodiment of the present invention, FIG. 6 is a schematic view of a sealant coated on a first substrate according to another embodiment of the present invention, and FIG. 7 is a schematic, top view of a display panel according to another embodiment of the present invention. Referring to FIG. 5 and FIG. 6, as mentioned in step S510, firstly, the first substrate 210 having the display region 212 and the sealant coating region 214 is provided, wherein the sealant coating region 214 surrounds the display region 212. After that, a sealant 630 is formed in the sealant coating region 214. More specifically, as mentioned in step S520, firstly, a first sealant strip 632 is coated along a first direction X1 in the sealant coating region 214, and then as mentioned in step S530, a second sealant strip 634 is coated along a second direction X2. A first distance S1 is formed between the first sealant strip 632 and the display region 212, and a second distance S2 is formed between the second sealant strip 634 and the display region 212, wherein S1 and S2 are positive numbers, that is, S1>0 and S2>0. In the present embodiment, the distance S1 is, for example, but not limited to, equal to the second distance S2. Additionally, a third distance D is formed between two ends of the second sealant strip 634 and the first sealant strip 632 adjacent to the second sealant strip 634. In the present embodiment, the third distance D is, for example, smaller than 100 micrometers.

More specifically, in the present embodiment, the first sealant strip 632 and the second sealant strip 634 are formed in the sealant coating region 214 of the first substrate 210 via, for example, a dispensing method. Moreover, in the present embodiment, although the first sealant strip 632 is coated along the first direction X1 before the second sealant strip 634 is coated along the second direction X2, the present invention does not limit the forming sequence of the first sealant strip 632 and the second sealant strip 634. For example, the first sealant strip 632 and the second sealant strip 634 can also be formed simultaneously via a screen printing method.

After that, referring to FIG. 5 and FIG. 7, as mentioned in step S540, the second substrate 220 is provided, and the second substrate 220 is pressed onto the first substrate 210. Moreover, in the present embodiment, after the sealant 230 is formed, the display medium layer 240 is formed in the display region 212. The display medium layer 240 of the present embodiment is, for example, the liquid crystal layer. A method for forming the display medium layer 240 can be the injection method or the one drop filling method. Those ordinarily skilled in the art should know the detail processes, and detailed description is omitted.

As shown in FIG. 7, after the second substrate 220 is pressed onto the first substrate 210, the first sealant 632 and the second sealant 634 are respectively extended along the first direction X1 and the second direction X2 and intersect with each other, and thus corner portions 636 are formed. Specifically, each corner portion 636 includes at least one extending block 637 located on a side of the corner portion 636 away from the display region 212 and extended along at least one of the first direction X1 and the second direction X2. In the present embodiment, referring to FIG. 6 and FIG. 7, the extending blocks 637 are extended along the first direction X1 from the sides of the corner portions 636 away from the display region 212. A length L1 of each of the extending blocks 637 along the first direction X1 can be determined according to sizes of the thickness, the viscosity and the third distance D of the first sealant strip 632. For example, the length L1 of each of the extending blocks 637 of the present embodiment is, for example, one third of a width $W_1$ of the first sealant strip 632.

Figure 8:
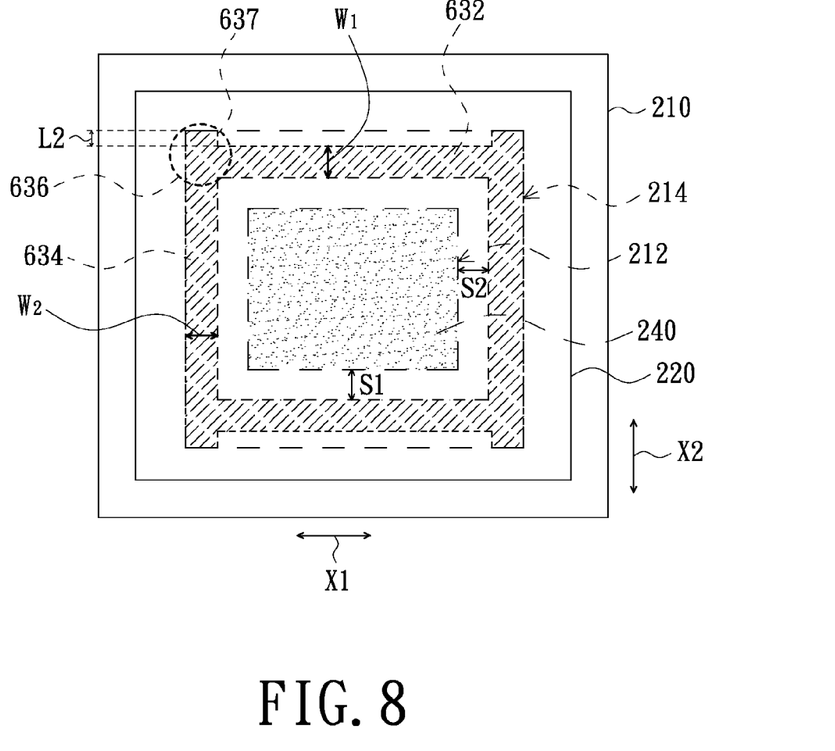
FIG. 8 is a schematic, top view of a display panel according to another embodiment of the present invention.
Figure 9:
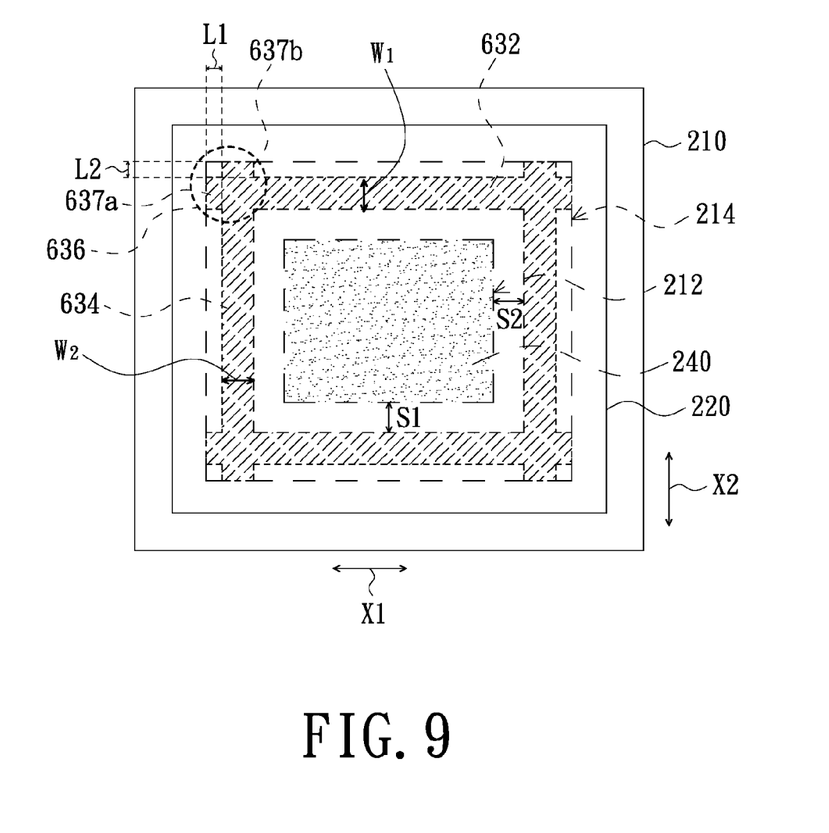
FIG. 9 is a schematic, top view of a display panel according to another embodiment of the present invention.
Figure 10:
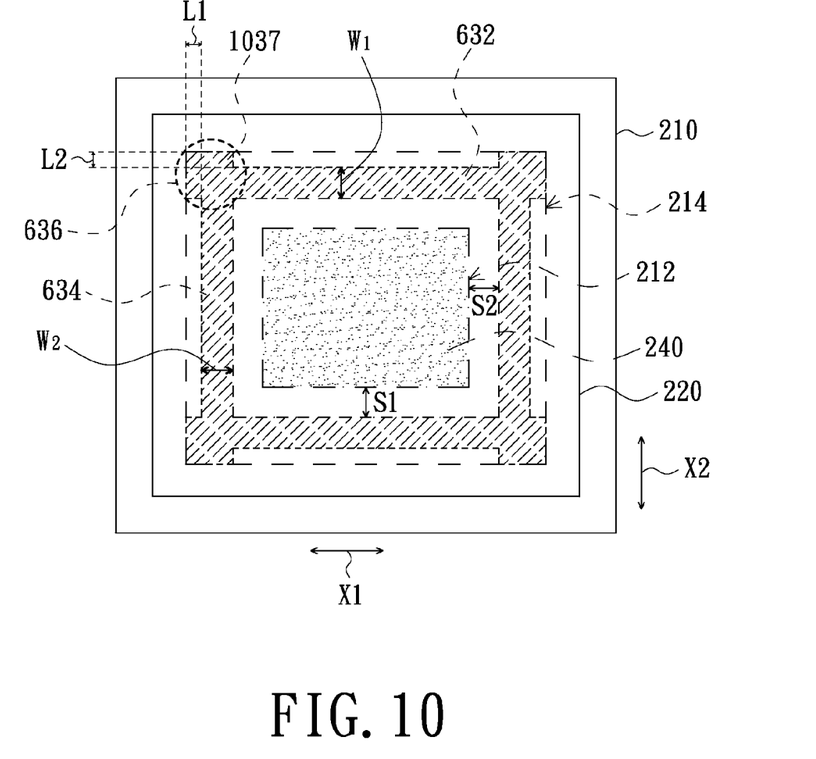
FIG. 10 is a schematic, top view of a display panel according to another embodiment of the present invention.

In addition, in another embodiment of the present invention as shown in FIG. 8, the extending blocks 637 of the corner portions 636 of the sealant 630 can be extended along the second direction from the sides of the corner portions 636 away from the display region 212. Moreover, as shown in FIG. 9, each corner portion 636 of the sealant 630 can simultaneously include an extending block 637a extending along the first direction and an extending block 637b extending along the second direction. In an alternative embodiment, as shown in FIG. 10, each corner portion 636 of the sealant 630 can also include an extending block 1037 simultaneously extending along the first direction and the second direction.

Figure 11:
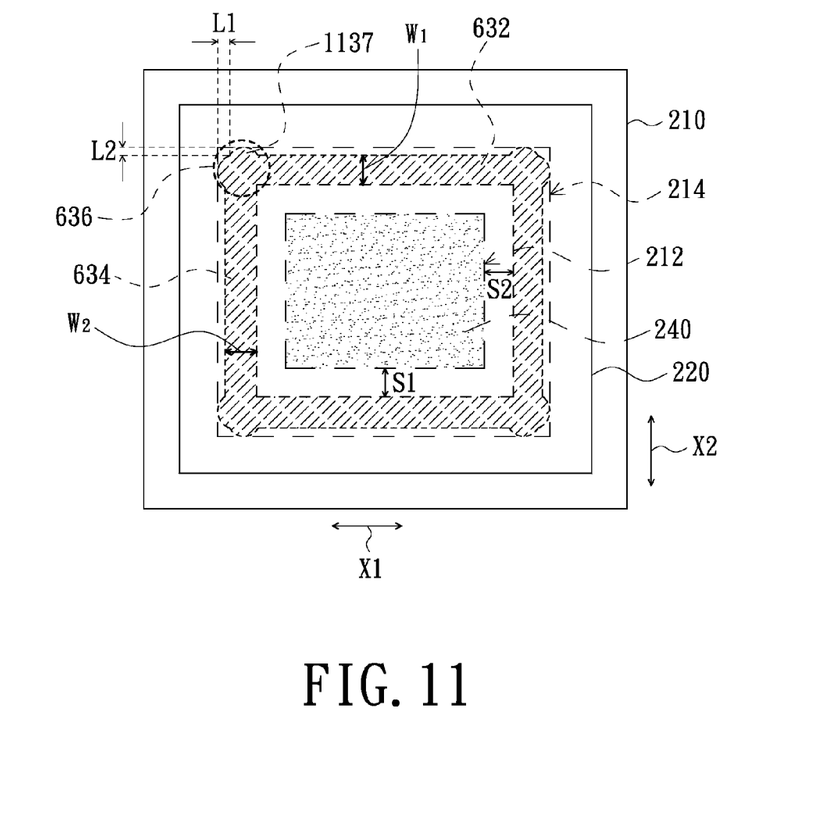
FIG. 11 is a schematic, top view of a display panel according to another embodiment of the present invention.

It is worth mentioning that, in the above-mentioned embodiments, although the extending blocks are quadrilateral and are formed via extending the first sealant strip 632 and/or the second sealant strip 634, but the present invention is limited to the above-mentioned embodiments. In another embodiment, as shown in FIG. 11, extending blocks 1137 can be sector-shaped.

In the display panel of the above-mentioned embodiments, since the corner portions of the sealant have the extending blocks extending along the first direction and/or the second direction from the sides of the corner portions away from the display region, the area of the corner portions of the sealant contacted with the first substrate and the second substrate can be increased, and thereby the tensile strength of the corner portions of the sealant can be promoted. More specifically, in the above-mentioned embodiments, the tensile strength of the corner portions of the sealant can be promoted by 20 percent to 30 percent.

Moreover, in the above-mentioned embodiments, except being formed via the dispensing method, the sealant having extending blocks can be, but not limited to, formed via the screen printing method.

Specifically, in the embodiment that the sealant is formed via the screen printing method, the sealant can be designed to have retracting regions, so that the sealant is avoided from being too close to the display region. Thereby, the display medium layer in the display region can be prevented from being polluted. Examples for this will be described below with drawings.

Figure 12:
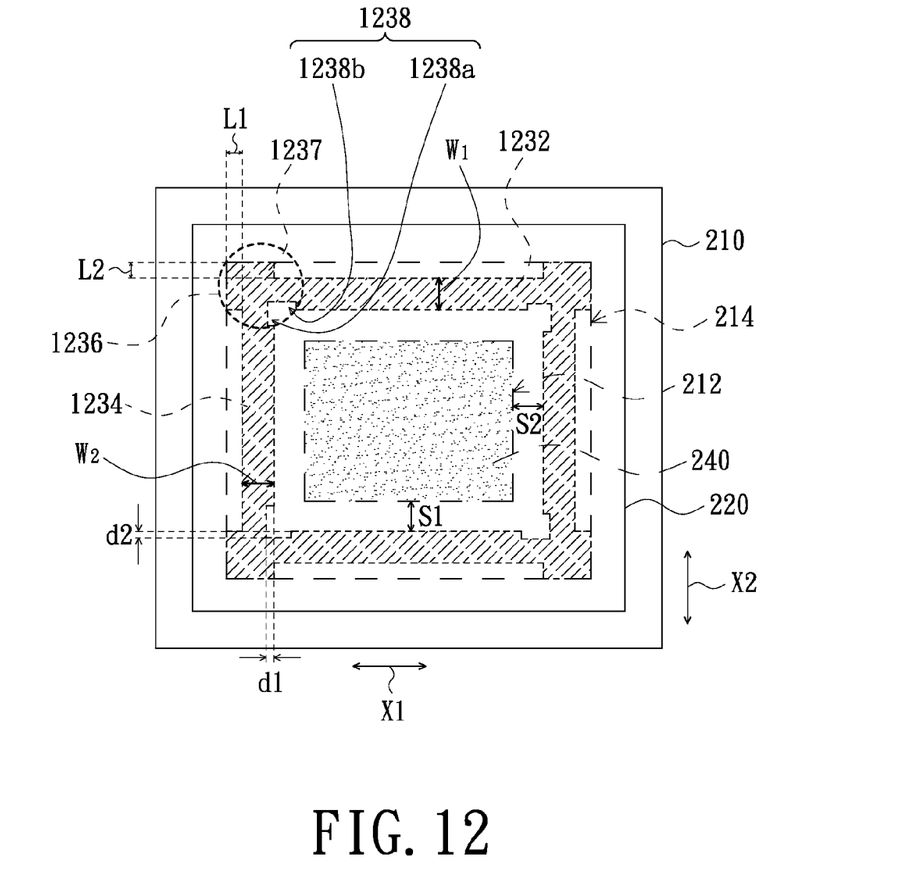
FIG. 12 is a schematic, top view of a display panel according to another embodiment of the present invention.

FIG. 12 is a schematic, top view of a sealant formed on a first substrate according to another embodiment of the present invention. Referring to FIG. 12, a sealant is formed on the first substrate 210 and is mainly constituted of two first sealant strips 1232, two second sealant strips 1234 and four corner portions 1236. Each corner portion 1236 includes an extending block 1237 and a retracting region 1238, and the extending block 1237 of the present embodiment can be, but not limited to, simultaneously extended away from the display region 212 along the first direction X1 and the second direction X2. The retracting region 1238 is retracted from a side of the corner portions 1236 adjacent to the display region 212 along a direction away from the display region 212.

In the present embodiment, each corner portion 1236 can simultaneously have a retracting region 1238a retracted away from the display region 212 along the first direction X1 and a retracting region 1238b retracted away from the display region 212 along the second direction X2. More specifically, if the retracting distance of the retracting region 1238a is d1, and a width of the second sealant strips 1234 is $W_2$, the retracting distance d1 meets the following expression: $W_2/10 \leq d1 \leq W_2/5$. Similarly, if the retracting distance of the retracting region 1238b is d2, and a width of the first sealant strips 1232 is $W_1$, the retracting distance d2 meets the following expression: $W_1/10 \leq d2 \leq W_1/5$.

Figure 13:
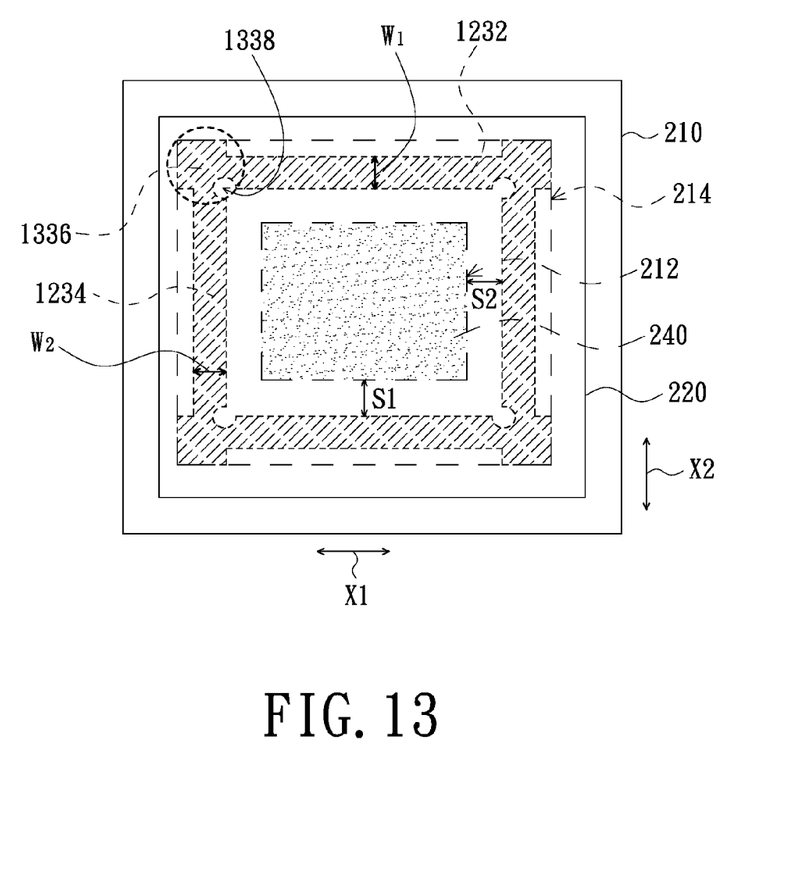
FIG. 13 is a schematic, top view of a display panel according to another embodiment of the present invention.
Figure 14:
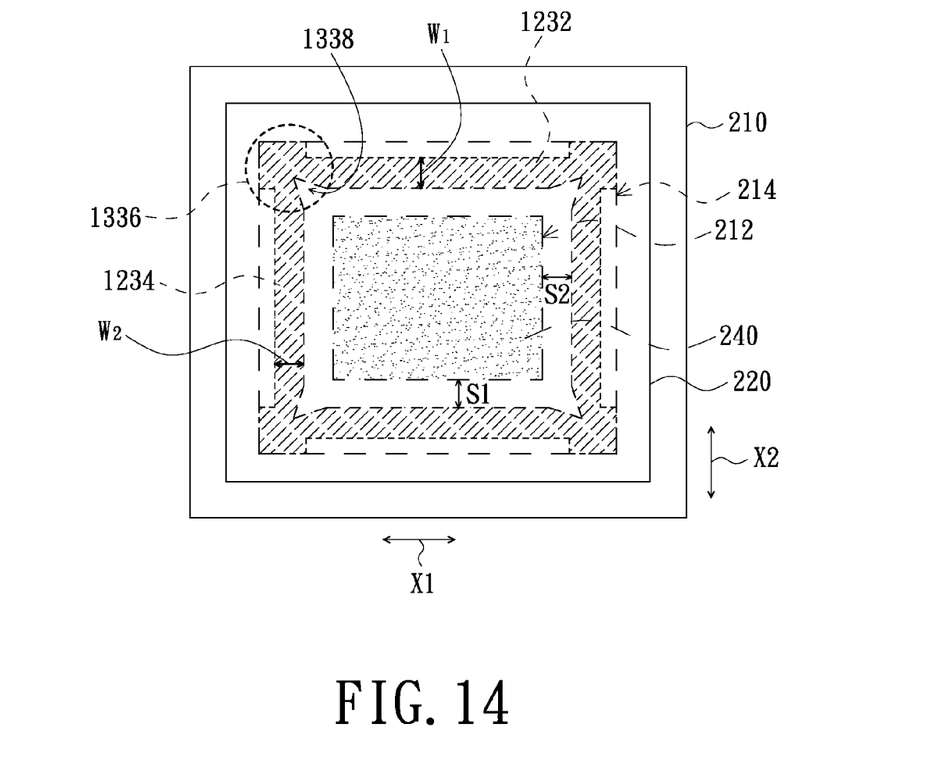
FIG. 14 is a schematic, top view of a display panel according to another embodiment of the present invention.

In addition, in other embodiments of the present invention, as shown in FIG. 13 and FIG. 14, a retracting region 1338 of each corner portion 1336 can be simultaneously retracted along the first direction X1 and the second direction X2, so that arc-shaped or angular retracting region 1338 is formed.

In summary, in the present invention, the width of the sealant is increased from the side of the sealant away from the display region, so that the maximum width of the corner portions of the sealant is larger than the width of the strip-shaped portions. In such way, the sealant does not pollute the display medium layer, and the area of the sealant contacted with the first substrate and the second substrate is increased. Thereby, the tensile strength of the sealant is promoted.

Moreover, in the present invention, since the width of the corner portions can be determined by the screen printing method or the moving speed of the sealant coating apparatus, the width of the corner portions of the sealant can be controlled in a suitable scale. Therefore, the sealant is avoided from exceeding cutting lines of the substrates such that a cutting defect can be prevented.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A manufacturing method of display panel comprising:
   providing a first substrate, the first substrate having a display region and a sealant coating region, the sealant coating region surrounding the display region;
   coating a first sealant strip in the sealant coating region along a first direction, a first distance being formed between the first sealant strip and the display region;
   coating a second sealant strip in the sealant coating region along a second direction, a third distance D being formed between two ends of the second sealant strip and the first sealant strip adjacent to the second sealant strip, and a second distance being formed between the second sealant strip and the display region; and
   providing a second substrate and pressing the second substrate onto the first substrate,
   wherein after the second substrate is pressed onto the first substrate, the first sealant strip and the second sealant strip are respectively extended along the first direction and the second direction, and then the first sealant strip and the second sealant strip intersect with each other to form a corner portion, the corner portion comprises at least one extending block extended along at least one of the first direction and the second direction from a side of the corner portion away from the display region.

2. The manufacturing method according to claim 1, further comprising forming a display medium layer in the display region of the first substrate after forming the first sealant strip and the second sealant strip.

3. The manufacturing method according to claim 1, wherein the extending block is extended along the first direction, and a length of the extending block along the first direction is smaller than one third of a width of the first sealant strip.

4. The manufacturing method according to claim 1, wherein the extending block is extended along the second direction, and a length of the extending block along the second direction is smaller than one third of a width of the second sealant strip.

5. The manufacturing method according to claim 1, wherein the third distance D meets the following expression: $0 < D \leq 100$ micrometers.

6. A manufacturing method of display panel comprising:
   providing a first substrate, the first substrate having a display region and a sealant coating region, the sealant coating region surrounding the display region, the sealant coating region comprising at least one corner region and a plurality of strip-shaped regions, the corner region being located between the adjacent strip-shaped regions;
   providing a sealant coating apparatus suitable to be moved along the sealant coating region;
   coating a sealant in the sealant coating region via the sealant coating apparatus, a distance being formed between the sealant and the display region, and a speed of the sealant coating apparatus moved along the corner region being smaller than or being equal to one third of a speed of the sealant coating apparatus moved along the strip-shaped regions such that a plurality of corner portions of the sealant which are approximate to right angles is formed in the sealant coating region; and
   providing a second substrate and pressing the second substrate onto the first substrate, the second substrate being fixed to the first substrate via the sealant.

7. The manufacturing method according to claim 6, further comprising forming a liquid crystal display layer in the display region of the first substrate after forming the sealant.

* * * * *